(12) United States Patent
Hanashima et al.

(10) Patent No.: US 7,722,053 B2
(45) Date of Patent: *May 25, 2010

(54) OUTER RING AND CLAMP-TYPE JOINT FOR VACUUM APPARATUS

(75) Inventors: Kanji Hanashima, Hamamatsu (JP); Hideaki Mori, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 923 days.

This patent is subject to a terminal disclaimer.

(21) Appl. No.: 11/473,156

(22) Filed: Jun. 23, 2006

(65) Prior Publication Data

US 2007/0001403 A1 Jan. 4, 2007

(30) Foreign Application Priority Data

Jul. 4, 2005 (JP) .............................. 2005-194701

(51) Int. Cl.
*F16L 17/06* (2006.01)
*F16J 15/02* (2006.01)

(52) U.S. Cl. ..................... 277/611; 277/616; 277/641; 285/379

(58) Field of Classification Search ................ 277/611, 277/616, 641; 285/379
See application file for complete search history.

(56) References Cited

U.S. PATENT DOCUMENTS

| | | | | |
|---|---|---|---|---|
| 2,789,844 A | * | 4/1957 | Kessler ........................ 285/336 |
| 3,215,442 A | * | 11/1965 | Papenguth ................... 277/611 |
| 3,279,805 A | * | 10/1966 | Quinson ...................... 277/611 |
| 3,531,133 A | * | 9/1970 | Gulick et al. ................ 277/611 |
| 3,704,021 A | * | 11/1972 | Barbarin et al. ............. 277/611 |
| 3,747,963 A | * | 7/1973 | Shivak ........................ 285/336 |
| 3,857,572 A | * | 12/1974 | Taylor et al. ................ 277/609 |
| 3,892,416 A | * | 7/1975 | Ruhe et al. .................. 277/611 |
| 4,095,809 A | * | 6/1978 | Smith .......................... 277/611 |
| 4,381,869 A | * | 5/1983 | Abbes et al. ................ 277/639 |
| 5,222,747 A | * | 6/1993 | McGarvey ................... 277/614 |
| 5,505,464 A | * | 4/1996 | McGarvey ................... 277/614 |
| 5,518,257 A | * | 5/1996 | Breaker ....................... 277/612 |
| 6,325,390 B1 | * | 12/2001 | Sillmon ....................... 277/614 |
| 6,361,049 B1 | * | 3/2002 | Joco ............................ 277/312 |
| 6,708,984 B1 | * | 3/2004 | North et al. .................. 277/608 |
| 2004/0188955 A1 | * | 9/2004 | Takahiro et al. ............. 277/626 |
| 2007/0001404 A1 | * | 1/2007 | Mori et al. ................... 277/590 |

OTHER PUBLICATIONS

U.S. Appl. No. 11/473,183, filed Jun. 23, 2006, Mori, et al.

* cited by examiner

*Primary Examiner*—Alison K Pickard
(74) *Attorney, Agent, or Firm*—Oblon, Spivak, McClelland, Maier & Neustadt, L.L.P.

(57) ABSTRACT

An outer ring of a clamp-type joint for vacuum apparatus is disclosed. The joint includes a base forming an outer circumferential side and a pair of brims respectively extending from the top and bottom of the base toward the center axis of the joint, the inner side of the brims on which the brims come into contact with the O-ring being in the form of a convex sector, of which the arc faces the O-ring. The radius r of the circle forming the sector is 0.6-2.5 mm and the thickness ($t_0$) satisfies the following formula: $t_1 - 0.2 \leq t_0 \leq t_1 + 0.4$. In the formula, $t_1$ is a thickness (mm) of the center ring at the point at which the center ring engages with the O-ring. The clamp-type joint can exhibit stable sealing performance at a high temperature of 250° C. or more without cracking of the O-ring.

5 Claims, 3 Drawing Sheets

OUTER RING AND CLAMP-TYPE JOINT FOR VACUUM APPARATUS

BACKGROUND OF THE INVENTION

1. Field of the Invention

The present invention relates to an outer ring and a clamp-type joint for vacuum apparatus using the outer ring, which does not cause cracking of an O-ring during use at a high temperature.

2. Background Art

A typical example of a conventional clamp-type joint for vacuum apparatus specified in JIS B8365 (ISO 2861/1) ("Dimensions and shapes of clamp-type joint for vacuum apparatus", 1988, hereinafter referred to as "JIS standard") is shown in FIG. 3. The clamp-type joint for vacuum apparatus 100 has a coupling 101 having a pair of parallel flat planes 111 and 111, a center ring 102, of which the outer circumference is a concave groove 112, inserted between the pair of flat planes 111 and 111 of the coupling 101, an O-ring 103 engaged with the concave groove 112 of the center ring 102, and a brim 113 of the coupling 101 which is fastened by clamps (not shown) to seal fluids in the planes 111 and 111 of the coupling 101 and the face of the O-ring 103.

A slight internal pressure (positive pressure) may be applied to the clamp-type joint for vacuum apparatus 100, even in the case in which the sealing object is a vacuum pipe. If an internal pressure is applied, the O-ring of the clamp-type joint expands outwardly, thereby inhibiting stable sealing performance and causing a fluid to leak. In the worst case, the O-ring may come off from the clamp-type joint, thereby inhibiting sealing. In order to obviate this problem and to inhibit outward expansion of the O-ring 103 due to internal pressure, an outer ring 105 with a U-shaped cross-section made of metal is provided around the circumference of the O-ring 103 in a manner to cause the O-ring 103 to be engaged therewith, as shown in FIG. 4. A clamp-type joint for vacuum apparatus 200 having this structure can inhibit outward expansion of the O-ring when internal pressure is applied in a pipe of a vacuum apparatus, thereby ensuring stable sealing performance. In addition, since O-rings used for clamp-type joints have improved heat resistance in recent years, the clamp-type joint used in pipes of vacuum apparatuses are used at a high temperature of 200° C. or more in certain occasions.

However, if the clamp-type joint for vacuum apparatus 200 equipped with an outer ring is used at a high temperature of 200° C. or more, the O-ring 103 may crack, resulting in sealing failure in the worst case.

An object of the present invention is, therefore, to provide a clamp-type joint for vacuum apparatus which can exhibit stable sealing performance at a high temperature of 200° C. or more without cracking of the O-ring and an outer ring used with the clamp-type joint.

In view of this situation, the inventors of the present invention have conducted extensive studies. As a result, the inventors have found that (1) the O-ring cracks at the parts in which a pair of top and bottom brims forming a U-shaped outer ring contacts (X in FIG. 5), (2) analysis using a finite element method (FEM) taking into consideration the coefficient of thermal expansion at a high temperature of 250° C. confirmed, based on the internal stress distribution of the O-ring as shown in FIG. 5, that a maximum large stress of 54 MPa is concentrated in the X parts, (3) due to the greater coefficient of thermal expansion of the rubber used for the O-ring than the coefficient of thermal expansion of metal used for the outer ring by several digits, the O-ring significantly expands outwardly, is pressed against the outer ring, and strongly pushes the brim of the outer ring at high temperatures, creating a large stress concentration, which results in cracking of the O-ring, and therefore, (4) if the brim has a shape of a convex sector on the side coming in contact with the O-ring, the stress concentration to that part can be reduced and the problem of O-ring cracking can be solved. These findings have led to the completion of the present invention.

SUMMARY OF THE INVENTION

Specifically, the present invention provides an outer ring of a clamp-type joint for vacuum apparatus installed on the outer circumference of an O-ring engaging with the peripheral edge of a center ring in a manner sandwiching the O-ring, comprising a base forming a outer circumferential side and a pair of brims respectively extending from the top and bottom of the base toward the center axis of the joint, the inner side of the brims on which the brims come into contact with the O-ring being in the form of a convex sector, of which the arc faces the O-ring, the radius of the circle forming the sector being 0.6-2.5 mm and the thickness ($t_0$) satisfying the following formula:

$$t_1 - 0.2 \leq t_0 \leq t_1 + 0.4,$$

wherein $t_1$ is a thickness (mm) of the center ring at the point at which the center ring engages with the O-ring.

The present invention also provides a clamp-type joint for vacuum apparatus comprising the above outer ring incorporated therein.

The clamp-type joint for vacuum apparatus and the outer ring used therein of the present invention do not produce a large stress concentration even if the O-ring significantly expands outwardly and is pressed against the outer ring at a high temperature because the O-ring and outer ring are respectively in the form of an arc having a large curvature. Therefore, O-ring cracking which has been a problem in conventional clamp-type joints can be avoided. According to the O-ring of the present invention, cracking of the O-ring can be avoided, safe and firm engagement of the O-ring with the outer ring can be ensured, and the outer ring does not come off from the O-ring.

DETAILED DESCRIPTION OF THE INVENTION AND PREFERRED EMBODIMENTS

Figure 1:
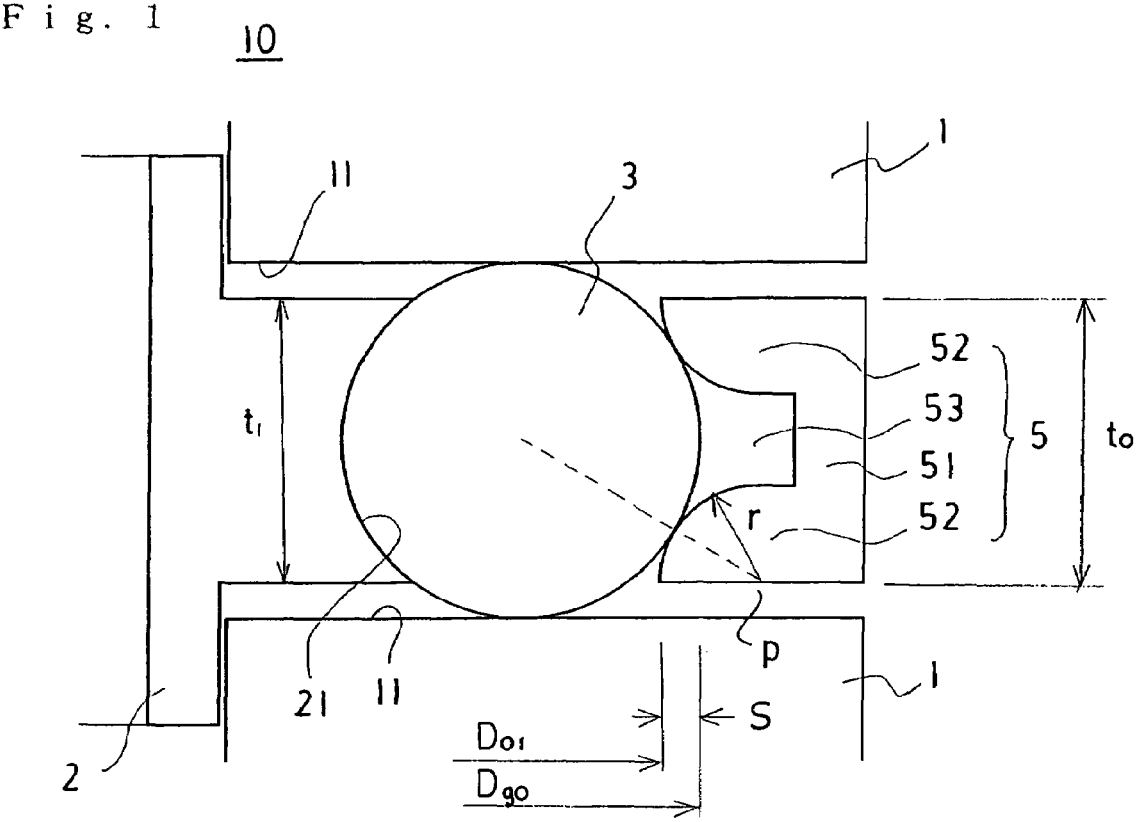
FIG. 1 is a cross-sectional view of a clamp-type joint for vacuum apparatus, shown enlarged in part, according to a first embodiment of the present invention.

A first embodiment of the outer ring and the clamp-type joint for vacuum apparatus of the present invention will now be explained with reference to FIG. 1. FIG. 1 is a cross-sectional view of a clamp-type joint for vacuum apparatus, shown enlarged in part, according to this embodiment. In the drawing, the clamps are omitted. In the description, the term "inside" of the clamp-type joint for vacuum apparatus refers to the center axis side of the joint and the term "outside" refers to the side opposing to the inside. When "inside" is used with a brim of the outer ring, the term "inside" refers to the side of the groove existing between a pair of brims.

The clamp-type joint for vacuum apparatus 10 has a coupling 1 having a pair of flat planes 11 and 11, a center ring 2, of which the outer circumference is a concave groove 21, inserted between the pair of flat planes 11 and 11 of the coupling 1, an O-ring 3 engaged with the concave groove 21 of the center ring 2, and an outer ring 5 inserted in the circumference of the O-ring 3 in the manner sandwiching the O-ring 3, the coupling 1 is fastened by clamps (not shown) to seal fluids by the flat planes 11 and 11 of the coupling 1 and the face of the O-ring 3.

The center ring 2 functions to secure the O-ring 3 and makes it easy for axially joining the couplings. Its configuration is specified by the JIS standard, according to which the thickness (shown as $t_1$ in FIG. 1) of the ring portion for forming the concave groove 21 is 3.9 mm. The configuration of the O-ring 3 which engages with the concave groove 21 of the center ring 2 is also specified in the JIS standard, according to which the diameter of the circular cross-section is 5 mm. The O-ring 3 is made of rubber. Fluororubber or perfluororubber with high heat resistance is preferable for ensuring durability during use at high temperatures of 200° C. or more.

The outer ring 5 of the present invention is installed in the manner to sandwich the O-ring 3 and has a base 51, of which the cross-section forming the perimeter side is rectangular, and a pair of brims 52 and 52, respectively extending from the top and bottom of the base 51 toward the center axis of the joint (the left side of FIG. 1). The inner side of the brims 52 and 52 (the side of groove 53 provided between the pair of brims 52 and 52 in FIG. 1) is in the form of a convex sector, of which the arc faces the O-ring 3.

The pivot of the sector, i.e. the center p of the circle forming the sector, is at the intersection of the line connecting the center of the O-ring 3 and the point on the O-ring 3 at which the O-ring 3 comes into contact with the outer ring 5 and the outermost side of the outer ring 5 in the vertical direction. The radius r of the circle forming the sector is 0.6-2.5 mm, preferably 0.8-2 mm, and particularly preferably 1.2-1.7 mm. If the radius r of the circle forming the sector is less than 0.6 mm, the stress concentration generated at high temperatures increases and may cause cracking of the O-ring. If the radius r of the circle forming the sector is greater than 2.5 mm, the difference S between the outer diameter $D_{go}$ of the O-ring 3 and the inner diameter $D_{oi}$ of the outer ring 5 is so small that the outer ring 5 may easily come off from the O-ring 3. The outer ring 5 has a thickness $t_0$ satisfying the formula $t_1-0.2 \leq t_0 \leq t_1+0.4$, preferably $t_1 \leq t_0 \leq t_1+0.2$, and particularly preferably $t_0=t_1+0.1$, wherein $t_1$, is the thickness (mm) of the center ring at the point engaging with the O-ring. If the thickness $t_0$ of the outer ring 5 is less than $(t_1-0.2)$ mm, a great clearance is produced between the coupling 1 and the outer ring 5, allowing the O-ring 3 to enter the clearance at a high temperature, which may cause the O-ring to crack. If the thickness to of the outer ring 5 is greater than $(t_1+0.4)$ mm, a large clearance is produced between the coupling 1 and the center ring 2, allowing the O-ring 3 to be drawn into the inside and enter the clearance when sealing under vacuum. A stress concentration build up in that portion may cause the O-ring to crack.

The sector shape inside of the brims 52 and 52 is not limited to that shown in FIG. 1, but includes any round shape of which the arc forms a sector in the neighborhood of the point coming into contact with the O-ring 3. For example, the edges of the innermost parts of the brims 52 and 52 in FIG. 1 may be round. Although there are no specific limitations to the material used for the outer ring 5 inasmuch as it is a metallic material, a material having a coefficient of thermal expansion equivalent to or larger than the coefficient of thermal expansion of the material of the center ring 2 is preferable. Among the metallic materials, aluminum alloys are particularly preferable in view of the larger coefficient of thermal expansion.

In the clamp-type joint for vacuum apparatus 10, not only the outer ring 5 does not come off from the O-ring 3, but also a stress concentration caused by thermal deformation due to heat generated during the use at high temperatures of 200° C. or more can be reduced because of contact of the two circular arcs with a large curvature.

EXAMPLES

The present invention will be described in more detail by examples, which should not be construed as limiting the present invention.

Example 1

Figure 2:
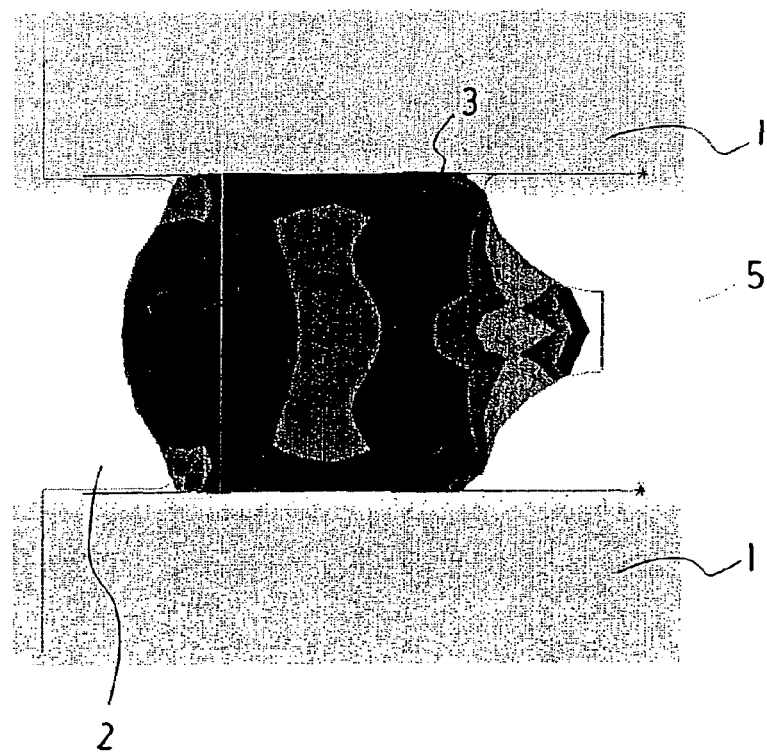
FIG. 2 shows an internal stress distribution of the O-ring of Example 1, determined using a known FEM analysis taking the coefficient of thermal expansion at 250° C. into consideration.
Figure 3:
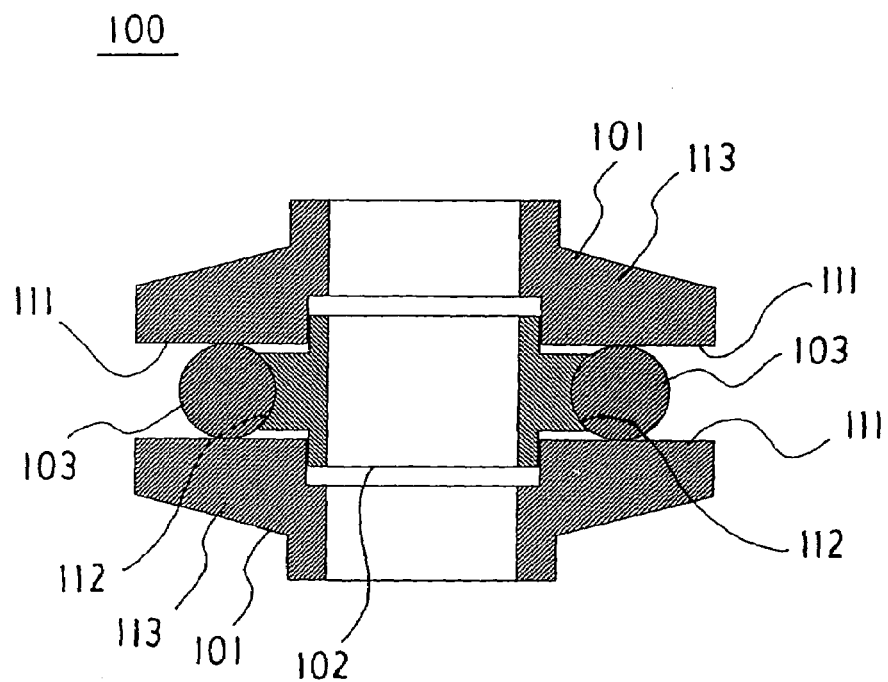
FIG. 3 is a cross-sectional view of a clamp-type joint for vacuum apparatus specified in JIS B 8365 (ISO 2861/1).
Figure 4:
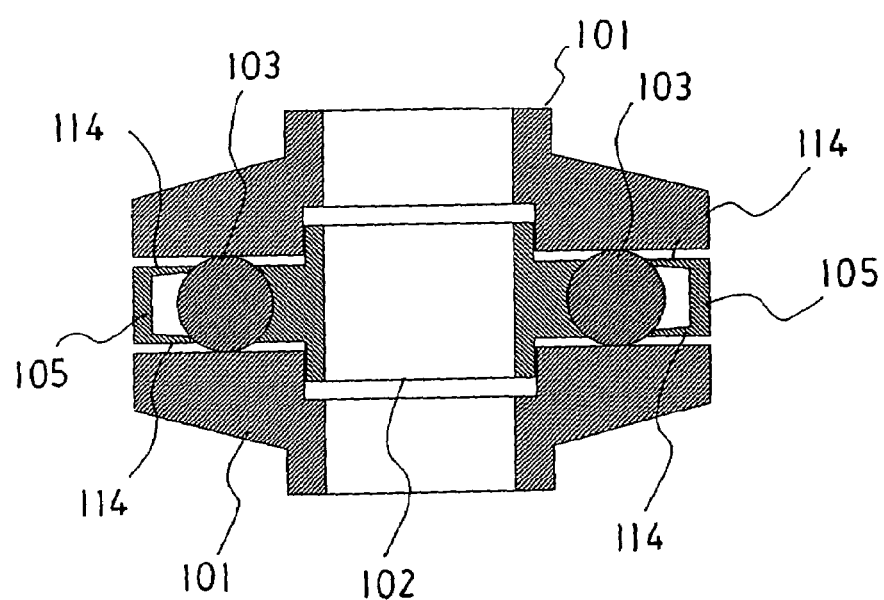
FIG. 4 shows an example of a conventional apparatus, based on the apparatus of FIG. 3, equipped with an outer ring.

A clamp-type joint for vacuum apparatus shown in FIG. 1 was prepared. SUS316L (coefficient of thermal expansion: $16.0 \times 10^{-6}/°$ C.) was used as the material for the coupling, center ring, and outer ring. As the material for the O-ring, a heat resistant perfluororubber composition (coefficient of thermal expansion: $2.6 \times 10^{-4}/°$ C.) ("BLAZER-BLACK" manufactured by Nichias Corp.) was used. The nominal diameter 40 (NW40) specified by the JIS standard was applied to the dimensions of the coupling, center ring, and O-ring. The external diameter of the outer ring was 56 mm, the radius r of the arc forming the sector was 1.5 mm, and the thickness to was 4.0 mm. The overlapping width S of the O-ring with the outer ring was 0.5 mm. The thickness $t_1$ of the center ring at the point at which the center ring engages with the O-ring was 3.9 mm. The following items of the resulting clamp-type joint for vacuum apparatus were evaluated. The results are shown in Table 1. The internal stress distribution of the O-ring determined by using a known FEM analysis taking the coefficient of thermal expansion at 250° C. into consideration is shown in FIG. 2.

Measurement of Maximum Stress and Point at which the Maximum Stress Occurs by FEM Analysis The maximum value of the internal stress (maximum stress) of the O-ring and the point at which the maximum stress occurs were determined using a known FEM analysis taking the coefficient of thermal expansion at 250° C. into consideration. In the Table, the case in which the maximum stress occurs on the outer ring side (the right side) was indicated as "Outer" and the case in which the maximum stress occurs on the center ring side (the left side) was indicated as "Center."

Cracking of O-Ring and the Points at which Cracks Occurred at 250° C.

A durability test under the conditions of 250° C. was carried out. After 20 hours, the clamp-type joint for vacuum apparatus was disassembled to inspect the presence or absence of cracks of the O-ring and the points at which the cracks occurred. In the Table, the clamp-type joint for vacuum apparatus with no cracks was indicated as "O", whereas the clamp-type joint in which a crack was observed was indicated as "X." In the Table, the case in which a crack was found on the outer ring side (the right side) was indicated as "Outer" and the case in which a crack was found on the center ring side (the left side) was indicated as "Center."

Ease of Separating Outer Ring from O-Ring

The conditions of engagement of the outer ring with O-ring before the durability test were inspected. The tested joint in which the state of engagement was maintained without the outer ring being separated from the O-ring is indicated as "O." The tested joint in which the outer ring was found to be separated from the O-ring at the time of inspection or separated when shaken several times is indicated as "X."

Examples 2-5 and Comparative Examples 1-4

Figure 5:
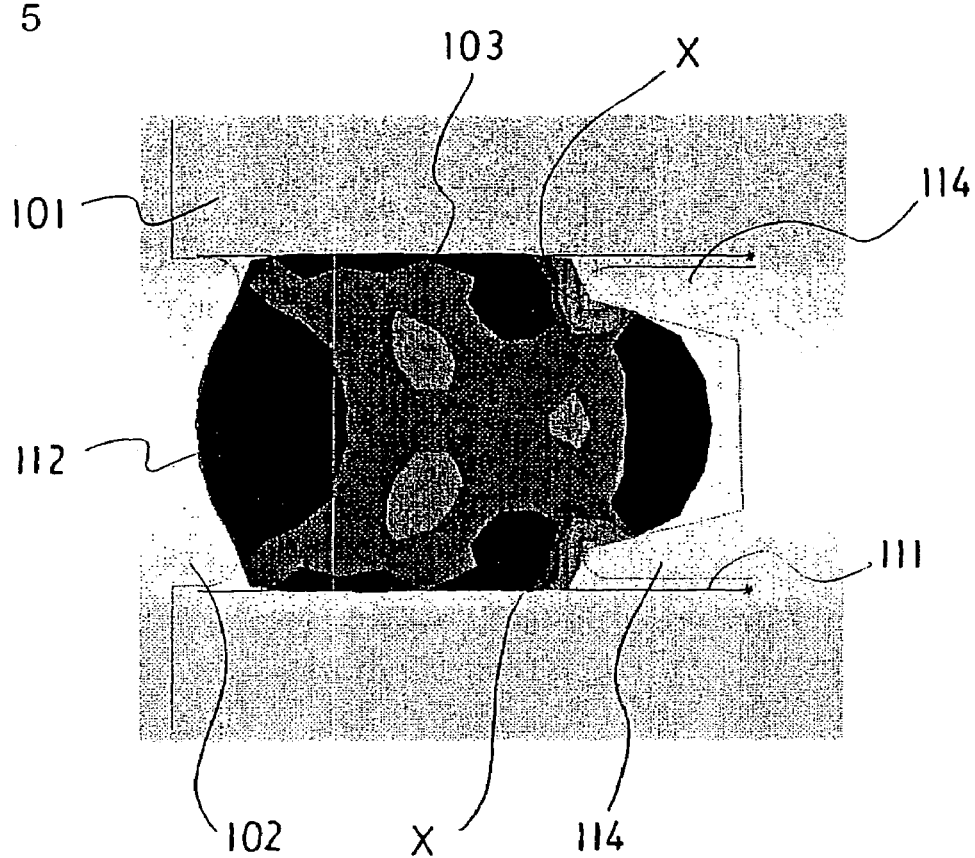
FIG. 5 shows an internal stress distribution of the O-ring of Comparative Example 1, determined using a known FEM analysis taking the coefficient of thermal expansion at 250° C. into consideration.

The same experiments as in Example 1 were carried out, except that the radius r of the arc forming the sector, the thickness of the outer ring, and the overlapping width S of the O-ring with the outer ring shown in Tables 1 and 2 were used. The results are shown in Tables 1 and 2. In the Comparative Example 1, the internal stress distribution of the O-ring was determined using a known FEM analysis taking the coefficient of thermal expansion at 250° C. into consideration. The results are shown in FIG. 5.

TABLE 1

|  | Example |  |  |  |  |
|---|---|---|---|---|---|
|  | 1 | 2 | 3 | 4 | 5 |
| Radius of sector of outer ring (r) (mm) | 1.5 | 1.0 | 2.0 | 1.5 | 1.5 |
| Thickness of outer ring ($t_0$) (mm) | 4.0 | 4.0 | 4.0 | 3.9 | 4.1 |
| Maximum stress (250° C.) | 25 | 35 | 30 | 28 | 25 |
| Position of maximum stress | Outer | Outer | Outer | Outer | Outer |
| Actual cracking (250° C.) | O | O | O | O | O |
| Actual position of cracking | — | — | — | — | — |
| Overlapping width (mm) | 0.5 | 0.6 | 0.5 | 0.5 | 0.5 |
| Actual ease of outer ring separation | O | O | O | O | O |

TABLE 2

|  | Comparative Example |  |  |  |
|---|---|---|---|---|
|  | 1 | 2 | 3 | 4 |
| Radius of sector of outer ring (r) (mm) | 0.5 | 3.0 | 1.5 | 1.5 |
| Thickness of outer ring ($t_0$) (mm) | 4.0 | 4.0 | 3.5 | 4.5 |
| Maximum stress (250° C.) | 50 | 35 | 55 | 40 |
| Position of maximum stress | Outer | Outer | Outer | Center |
| Actual cracking (250° C.) | X | O | X | X |
| Actual position of cracking | Outer | — | Outer | Center |
| Overlapping width (mm) | 0.8 | 0.3 | 0.5 | 0.5 |
| Actual ease of outer ring separation | O | X | O | O |

As can be clearly understood from the results shown in FIGS. 2 and 5 and Tables 1 and 2, the FEM analysis of the clamp-type joint for vacuum apparatus of Example 1 confirmed no stress concentration in the O-ring and the maximum stress was no more than 25 MPa. On the other hand, the FEM analysis of the clamp-type joint for vacuum apparatus of Comparative Example 1 confirmed a stress concentration and the maximum stress was 50 MPa which was twice as large as that of Example 1. Like the clamp-type joint for vacuum apparatus of Example 1, the clamp-type joints of Examples 2-5 exhibited no stress concentration and produced no cracks in the O-ring caused by the outer ring. On the other hand, if the radius r of the arc forming the sector of the outer ring is too small (Comparative Example 1) or the thickness of the outer ring is too small (Comparative Example 3) or too large (Comparative Example 4), O-ring cracking was seen under high temperature conditions. In addition, there was a tendency for the outer ring to come off from the O-ring, when the radius r of the outer ring is too large (Comparative Example 2).

EXPLANATION OF SYMBOLS

1, 101: coupling
2, 102: center ring
3, 103: O-ring
5, 105: outer ring
r: dadius of circular arc forming sector of outer ring
$t_0$: thickness of outer ring
$t_1$: thickness of concave part of center ring
$D_{oi}$: inner diameter of outer ring
$D_{go}$: outer diameter of O-ring
51: base of outer ring
52: a pair of brims of outer ring

What is claimed is:

1. A clamp-type joint for a vacuum apparatus, comprising:
a center ring;
a rubber O-ring that engages with a peripheral edge of the center ring; and
an outer ring installed on an outer circumference of the O-ring in a manner that sandwiches the O-ring between the outer ring and the center ring, the outer ring including
a base that forms an outer circumferential side, and
a pair of brims that respectively extend from a top and bottom of the base toward a center axis of the clamp-type joint, each of the brims including an inner side on which the brims come into contact with the O-ring, the inner side of each of the brims being in the form of a convex sector, the convex sector including an arc that faces the O-ring, a radius of a circle that defines the convex sector being 0.6-2.5 mm and a thickness ($t_0$) of the outer ring satisfying the following formula:

$$t_1 - 0.2 \leq t_0 \leq t_1 + 0.4,$$

wherein $t_1$ is a thickness (mm) of the center ring at a point at which the center ring engages with the O-ring.

2. The clamp-type joint for a vacuum apparatus according to claim 1, wherein the radius of the circle forming the convex sector is 0.8-2 mm.

3. The clamp-type joint for a vacuum apparatus according to claim 1, wherein the thickness ($t_0$) of the outer ring satisfies the formula $t_1 \leq t_0 \leq t_1 + 0.2$.

4. The clamp-type joint according to claim 1, wherein the clamp-type joint is configured to be used under high temperature conditions of 200° C. or more.

5. The clamp-type joint for a vacuum apparatus according to claim 1, wherein a center of the circle that defines the convex sector is located at an intersection of a line that connects a center of a cross-sectional area of the O-ring and a point on the O-ring at which the O-ring comes into contact with the outer ring and an outermost side of the outer ring in a vertical direction.

* * * * *